(12) United States Patent
Baumer et al.

(10) Patent No.: US 11,345,329 B2
(45) Date of Patent: May 31, 2022

(54) USER INTERFACE AND METHOD FOR A MOTOR VEHICLE WITH A HYBRID DRIVE FOR DISPLAYING THE CHARGE STATE

(71) Applicant: Bayerische Motoren Werke Aktiengesellschaft, Munich (DE)

(72) Inventors: Klaus Baumer, Lappersdorf (DE); Thomas Christ, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 237 days.

(21) Appl. No.: 16/738,249

(22) Filed: Jan. 9, 2020

(65) Prior Publication Data

US 2020/0139847 A1 May 7, 2020

Related U.S. Application Data

(63) Continuation of application No. PCT/EP2018/066850, filed on Jun. 25, 2018.

(30) Foreign Application Priority Data

Jul. 10, 2017 (DE) .................... 10 2017 211 790.7

(51) Int. Cl.
*B60W 20/13* (2016.01)
*B60L 50/61* (2019.01)
*B60L 58/12* (2019.01)
*H02J 7/00* (2006.01)

(52) U.S. Cl.
CPC ............. *B60W 20/13* (2016.01); *B60L 50/61* (2019.02); *B60L 58/12* (2019.02); *H02J 7/0048* (2020.01);
(Continued)

(58) Field of Classification Search
CPC ...... B60L 58/12; B60L 50/61; B60L 2250/16; B60L 15/2054; B60L 50/16;
(Continued)

(56) References Cited

U.S. PATENT DOCUMENTS

2011/0137519 A1* 6/2011 Christie ................. G04G 21/04
701/36
2011/0166733 A1 7/2011 Yu et al.
(Continued)

FOREIGN PATENT DOCUMENTS

DE 10 2015 102 226 A1 8/2015
EP 2 489 990 A1 8/2012
EP 2 759 642 A1 7/2014

OTHER PUBLICATIONS

PCT/EP2018/066850, International Search Report dated Aug. 16, 2018 (Two (2) pages).
(Continued)

*Primary Examiner* — Stacy Whitmore
(74) *Attorney, Agent, or Firm* — Crowell & Moring LLP

(57) ABSTRACT

In connection with a user interface for a motor vehicle with a hybrid drive, a driver is able to select whether the hybrid drive is operated in an operating mode which consumes charge, or in an operating mode which retains charge. The user interface is configured to display the charge state of the energy store on a display, and to receive or calculate a charge state variable which is characteristic of the charge state. The charge state variable may be displayed with a first range of values in a first display area during operation of the hybrid drive in the charge-consuming operating mode. The charge state variable may be displayed with a second range of values, which is a subset of the first range of values, in a second display area during operation of the hybrid drive in the charge-retaining operating mode. The second display area is larger than a subrange of the first display area in which the second range of values is displayed.

17 Claims, 3 Drawing Sheets

(52) U.S. Cl.
CPC .... *B60L 2250/16* (2013.01); *B60W 2510/244* (2013.01)

(58) Field of Classification Search
CPC ............... B60L 2220/42; B60K 37/02; B60K 2370/169; B60K 2370/172; B60K 35/00; B60W 2050/146; B60W 2510/0666; B60W 2510/085; B60W 2510/244; B60Y 2200/92; Y02T 10/62; Y02T 10/70
See application file for complete search history.

(56) References Cited

U.S. PATENT DOCUMENTS

| | | | |
|---|---|---|---|
| 2013/0274971 A1* | 10/2013 | Takahashi | B60L 7/18 701/22 |
| 2014/0077941 A1* | 3/2014 | Yamamura | B60K 35/00 340/438 |
| 2014/0114512 A1 | 4/2014 | Treharne et al. | |
| 2015/0165907 A1* | 6/2015 | Limbacher | B60K 37/06 340/438 |
| 2016/0243959 A1 | 8/2016 | Kishida | |
| 2017/0351256 A1* | 12/2017 | Kumakiri | G05D 1/0061 |
| 2020/0094695 A1* | 3/2020 | Bowman | B60L 50/61 |

OTHER PUBLICATIONS

German-language German Search Report issued in German counterpart application No. 10 2017 211 790.7 dated May 16, 2018 (Five (5) pages).

\* cited by examiner

USER INTERFACE AND METHOD FOR A MOTOR VEHICLE WITH A HYBRID DRIVE FOR DISPLAYING THE CHARGE STATE

CROSS REFERENCE TO RELATED APPLICATIONS

This application is a continuation of PCT International Application No. PCT/EP2018/066850, filed Jun. 25, 2018, which claims priority under 35 U.S.C. § 119 from German Patent Application No. 10 2017 211 790.7, filed Jul. 10, 2017, the entire disclosures of which are herein expressly incorporated by reference.

BACKGROUND AND SUMMARY OF THE INVENTION

The invention relates to a user interface and to a method for displaying a state of charge of an energy store of a motor vehicle having a hybrid drive.

Various types of hybrid vehicle are known. Examples are plug-in hybrids that have an external charging possibility for an energy store that they contain, in particular a high-voltage store that they contain. As an alternative thereto, hybrid vehicles without an external charging possibility are also known.

The high-voltage store of a plug-in hybrid may in this case usually absorb more energy than the high-voltage store of a hybrid vehicle without an external charging possibility.

Hybrid vehicles usually comprise a display device by way of which a driver of the hybrid vehicle is able to view the current state of charge of the high-voltage store of the hybrid vehicle, wherein a conventional display device in this case displays the current state of charge in relation to a maximum state of charge.

If a driver of a plug-in hybrid does not have any possibility for externally charging the high-voltage store of his motor vehicle, then there is the possibility of the high-voltage store having a relatively low state of charge over large portions of the service life of the motor vehicle. The display of the state of charge on the conventional display device is in this case not very informative for the driver of the motor vehicle.

An object of the invention is to specify an alternative approach for displaying the state of charge of the energy store of the motor vehicle having a hybrid drive, which alternative approach at least alleviates the described problem.

It is pointed out that additional features of a patent claim dependent on an independent patent claim, without the features of the independent patent claim or in combination with only some of the features of the independent patent claim, may form a separate invention independent of the combination of all of the features of the independent patent claim and that may be made into the subject matter of an independent claim, of a divisional application or of a subsequent application. This applies in the same way to the technical teaching described in the description, which may form an invention independent of the features of the independent patent claims.

A first aspect of the invention relates to a user interface for a motor vehicle having a hybrid drive, wherein the hybrid drive comprises an electrical machine and an electrical energy store coupled to the electrical machine.

The hybrid drive is in this case able to be operated selectively in a charge-consuming mode of operation for the energy store and in a charge-retaining mode of operation for the energy store.

The charge-consuming mode of operation may in particular be referred to as "charge-depleting" mode of operation. In this case, a predefined, lower target state of charge may be sought for the energy store, for example, for the end of an assumed driving cycle of the motor vehicle.

The charge-retaining mode of operation may in particular be referred to as "charge sustaining" mode of operation. In this case, it may be sought for example for the state of charge of the energy store that the state of charge of the energy store at the end of an operating time window substantially corresponds to the state of charge at the beginning of the operating time window.

The driver is able to select whether the hybrid drive is operated in the charge-consuming mode of operation or the charge-retaining mode of operation.

In this case, the driver of the motor vehicle may select the operation of the hybrid drive in the charge-consuming mode of operation in particular only when the system limits, for example the state of charge of the energy store, permit operation of the hybrid drive in the charge-consuming mode of operation. By way of example, when a threshold for the state of charge of the energy store is dropped below, the charge-retaining mode of operation may be switched to automatically without an operator action by the driver.

The selection may in particular be made by way of an operating element, for example by way of a switch or of a touchscreen. As an alternative or in addition, the selection may also be made for example via a voice interface or by way of a smart device (for example smartphone) coupled to the motor vehicle.

The user interface is configured so as to display the state of charge of the energy store on a display, in particular a graphical display such as for example a screen in the interior of the motor vehicle, and for this purpose to receive or to calculate a state of charge variable characteristic of the state of charge.

The state of charge variable may in particular be a percentage-based indication about the state of charge of the energy store. As an alternative or in addition, the state of charge variable may be an absolute indication about the state of charge of the energy store, such as for example an indication about the absolute energy content of the energy store in the unit of watt hours.

During operation of the hybrid drive in the charge-consuming mode of operation, the state of charge variable is able to be displayed with a first value range in a first display area.

The first value range may in particular be indicated by an upper limit and a lower limit for the state of charge variable. By way of example, the upper limit may indicate the maximum state of charge of the energy store. The lower limit may for example indicate the minimum state of charge of the energy store at which deep discharge has not yet set in.

The first value range may thus, in one simple case, span for example an interval from 0% to 100% for the state of charge variable.

The first display area may in particular be a flat portion on the display that is used to display the state of charge variable. If for example the display has an absolute display surface with side lengths of 10 cm by 4 cm, then the first display area thereof may be a flat subrange having side lengths of 10 cm by 2 cm.

During operation of the hybrid drive in the charge-retaining mode of operation, the state of charge variable is able to be displayed with a second value range, which is a subset of the first value range, in a second display area.

The second value range may in particular be a value range relevant to the state of charge variable. By way of example, the state of charge variable may change substantially only constantly due to charging and discharging procedures. The second value range may thus for example be a subrange of the first value range containing the state of charge variable, but its upper and lower limit are not the maximum upper and lower limits of the energy store. Instead of this, the upper limit and the lower limit of the second value range may for example be determined by the fact that a fixed offset value is added to, respectively subtracted from, a current value of the state of charge variable.

The second value range may thus, in one simple case, span for example an interval from 40% to 60% for the state of charge variable when the state of charge variable lies for example at a value of 50%.

The second display area is larger than that subrange of the first display area in which the second value range is able to be displayed.

In the exemplary simple case, the first value range could for example be displayed in the first display area such that this first value range extends graphically evenly over the entire first display area.

That subrange of the first display area in which the second value range (in the example: 40% to 60%) is able to be displayed would thus extend for example over a side length of 2 cm.

The second display area is larger than this subrange of the first display area and thus extends for example over a side length of 6 cm.

Displayed marking of the first and the second value range in the first display area may in particular differ from the displayed marking in the second display area, even when the marked values are absolutely identical.

By way of example, in the case of a first value range from 0% to 100%, marking of the limit values with "0%" and "100%" may be displayed in the first display area. The limits of a second value range from 40% to 60% may in this case be marked with "40%" and "60%" in the first display area. In contrast thereto, in the case of the second value range from 40% to 60% in the second display area, the limit values of the second value range may be marked with "0%" and "100%". This marking relates for example to the relative state of charge of the energy store in the second value range.

Due to the fact that the second display area is larger (for example longer) than that subrange of the first display area in which the second value range is able to be displayed, the legibility of the display is in particular able to be increased.

The invention is in this case based on the finding that, by changing the display of the state of charge of the energy store, the driving experience is able to be improved for the driver of the motor vehicle. In particular when the motor vehicle is a plug-in hybrid (PHEV), changing the display of the state of charge is able to emulate the driving experience of a hybrid electric vehicle (HEV).

In one advantageous embodiment, the user interface is configured so as to graphically display the state of charge variable, and the display area is an image area on the display. This may in this case in particular be a display in the form of a scale in which for example a plurality of subranges are separated from one another by way of consecutive scale lines and/or colors.

The value range may be distributed for example linearly, exponentially or logarithmically across the display area.

In a further advantageous embodiment, the user interface is configured so as to display the state of charge variable, during operation of the hybrid drive in the charge-retaining mode of operation, with a scale division value that is lower in comparison with the operation of the hybrid drive in the charge-consuming mode of operation.

The scale division value is in this case the amount of the difference between values that belong to two consecutive scale lines.

As an alternative or in addition to a graphical display of the state of charge variable, this may be displayed in particular also as a number, such as for example as a percentage value.

In this case, the display area, in the same way as the value range, may be an interval of numbers to be displayed, wherein the state of charge variable, during operation of the hybrid drive in the charge-retaining mode of operation, is displayed in particular with a higher resolution in comparison with the operation of the hybrid drive in the charge-consuming mode of operation.

In a further advantageous embodiment, the user interface is configured, during operation of the hybrid drive in the charge-retaining mode of operation, so as to additionally display the state of charge variable with the first value range in the first display area.

By virtue of the additional display, it is in particular possible, in addition to improved visibility of the state of charge variable for a driver of the motor vehicle, also to display the absolute value of the state of charge variable.

In a further advantageous embodiment, the charge-retaining mode of operation is the initial mode of operation of the hybrid drive when the motor vehicle is started.

The initial mode of operation of the hybrid drive may in particular already be defined when the motor vehicle is supplied by the manufacturer to customers such that the charge-retaining mode of operation of the hybrid drive is the initial mode of operation when the motor vehicle is started.

As an alternative or in addition, the initial mode of operation of the hybrid drive may in particular also be able to be set by the driver of the motor vehicle. By way of example, this may be predefined by an operating action of the driver. The initial mode of operation of the hybrid drive when the motor vehicle is started may for example also be that mode of operation in which the hybrid drive was operated the last time the motor vehicle was stopped.

In a further advantageous embodiment, the user interface is configured, starting from the charge-retaining mode of operation, when charging the energy store by way of a charging device external to the vehicle, to automatically switch into the charge-consuming mode of operation and to accordingly change the display of the state of charge.

This change of the display is therefore in particular advantageous since the state of charge of the energy store is able to be increased by the charging procedure such that the state of charge variable exceeds the upper limit of the second value range. In this case, for example, the state of charge variable may no longer be displayed on the second display area.

In particular since the first value range is greater than the second value range, the state of charge variable is able to be displayed better on the first display area after a charging procedure.

In a further advantageous embodiment, the user interface is configured, starting from the charge-retaining mode of operation, when charging the energy store by way of a charging device external to the vehicle, to remain in the charge-retaining mode of operation and to shift the display of the state of charge in accordance with the new state of charge.

The shifting of the display while retaining the operating mode may in particular be performed such that the second value range is re-determined depending on the state of charge of the energy store at the end of the charging procedure. By way of example, the second value range may be re-determined such that the new value of the state of charge variable lies in this new second value range. The display of this new second value range on the second display area is comparable to shifting the display.

A second aspect of the invention describes a method for a motor vehicle having a hybrid drive, wherein the hybrid drive comprises an electrical machine and an electrical energy store coupled to the electrical machine.

The hybrid drive is able to be operated in a charge-consuming mode of operation for the energy store and in a charge-retaining mode of operation for the energy store. The driver is able to select whether the hybrid drive is operated in the charge-consuming mode of operation or the charge-retaining mode of operation.

In this case, the driver of the motor vehicle may select the operation of the hybrid drive in the charge-consuming mode of operation in particular only when the system limits, for example the state of charge of the energy store, permit operation of the hybrid drive in the charge-consuming mode of operation. By way of example, when a threshold for the state of charge of the energy store is dropped below, the charge-retaining mode of operation may be switched to automatically without an operator action by the driver.

In one step of the method, a variable characteristic of the state of charge of the energy store is received.

In a further step, the state of charge of the energy store is displayed on a display, wherein, during operation of the hybrid drive in the charge-consuming mode of operation, the state of charge variable is displayed with a first value range in a first display area.

During operation of the hybrid drive in the charge-retaining mode of operation, the state of charge variable is displayed with a second value range, which is a subset of the first value range, in a second display area and the second display area is shown larger than that subrange of the first display area in which the second value range is displayed.

The above explanations with regard to the user interface according to the invention according to the first aspect of the invention also apply analogously to the method according to the invention according to the second aspect of the invention. Advantageous exemplary embodiments that are not described explicitly at this juncture and in the patent claims of the method according to the invention according to the second aspect of the invention correspond to the advantageous exemplary embodiments described above or described in the patent claims of the user interface according to the invention according to the first aspect of the invention.

The invention is described below with reference to one exemplary embodiment with the aid of the appended drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
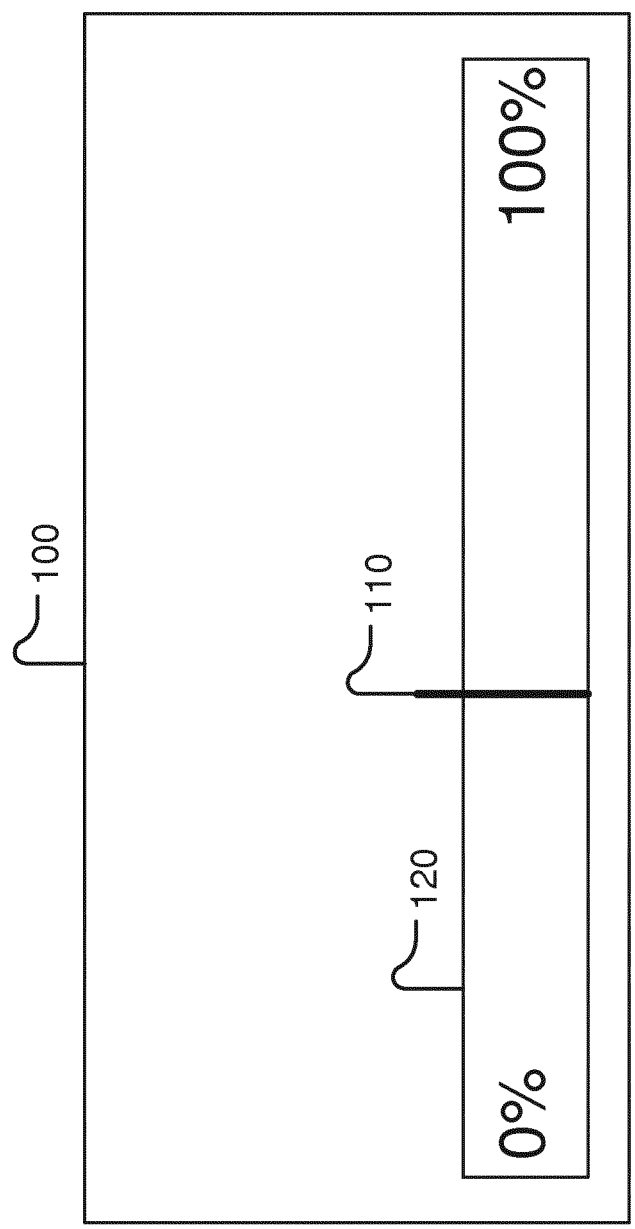
FIG. 1 shows an exemplary conventional embodiment of the user interface.

FIG. 1 shows an exemplary conventional embodiment of the user interface. In this case, the state of charge of an electrical energy store of a motor vehicle having a hybrid drive is displayed on a display 100 (for example a screen).

To display the state of charge of the energy store, a state of charge variable 110 characteristic of the state of charge of the energy store is received. This state of charge variable 110 is displayed with a first value range predefined by two limit values 0%, 100% in a first display area 120.

Figure 2:
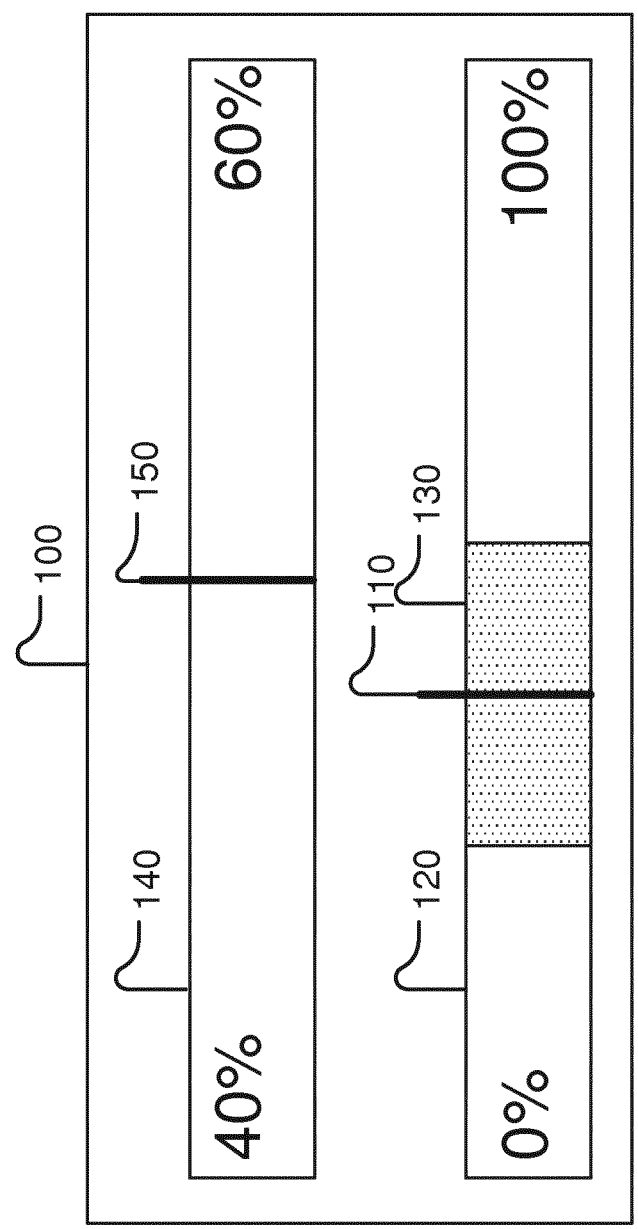
FIG. 2 shows a first exemplary embodiment of the user interface according to the invention.

FIG. 2 shows a first exemplary embodiment of the user interface according to the invention. In this case, in the same way as the first exemplary embodiment illustrated in FIG. 1, the state of charge of the electrical energy store of the motor vehicle having a hybrid drive is displayed on a display 100.

The state of charge variable 110 characteristic of the state of charge of the energy store is displayed with a first value range predefined by two limit values 0%, 100% in a first display area 120.

The state of charge variable 110 is situated for example in this case in a subrange 130 of the first value range, wherein this subrange 130 is likewise predefined by two limit values 40%, 60%.

Depending on the scale of the display of the state of charge in the first display area 120, this results in a particular size, for example a length of 2 cm, for the display of the subrange 130.

If the hybrid drive of the motor vehicle is then operated in a charge-retaining mode of operation, then the state of charge of the energy store is able to be displayed in a second display area 140. In particular, when the second display area 140 is displayed, the first display area 120 may be displayed in addition to the second display area 140.

The state of charge variable 150 is likewise displayed in the second display area 140. The state of charge variable 150 may be the same variable as the state of charge variable 110. As an alternative, the state of charge variable 150 may also be a variable converted from the state of charge variable 110 or a variable independent of the state of charge variable 110. The state of charge variable 150 is however displayed with a second value range, for example from 40% to 60%, in the second display area 140. The size of the second display area 140, for example its length of 8 cm, is in this case larger than the subrange 130 of the first display area 120 in which the second value range is displayed.

Figure 3:
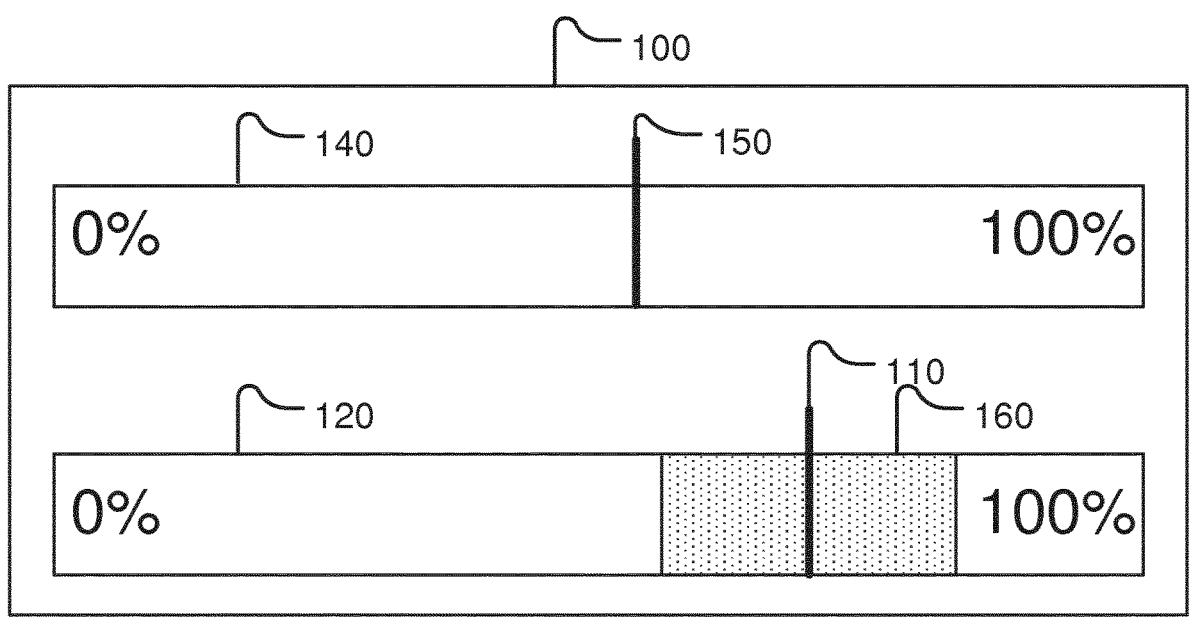
FIG. 3 shows a second exemplary embodiment of the user interface according to the invention.

FIG. 3 shows a second exemplary embodiment of the user interface according to the invention. In this case, in the same way as the exemplary embodiments illustrated in FIG. 1 and FIG. 2, the state of charge of the electrical energy store of the motor vehicle having a hybrid drive is displayed on a display 100.

The state of charge variable 110 characteristic of the state of charge of the energy store is displayed, with a first value range predefined by two limit values 0%, 100%, in a first display area 120.

The state of charge variable 110 is in this case situated for example in a second subrange 160 of the first value range, wherein this second subrange 160 is likewise predefined by two limit values 60%, 80%.

During operation of the hybrid drive of the motor vehicle in the charge-retaining mode of operation, the state of charge of the energy store is displayed in the second display area 140. In this case, the state of charge variable 150 may be displayed with a second value range, for example with the limit values 60% and 80%, in the second display area 140.

The marking of the scale of the second display area 140 may in this case however in particular differ from the actual limit values of the second value range, and describe for example an interval of 0% to 100%.

By decoupling the marking of the scale of the second display area 140 from the actual limit values of the second value range, a situation is in particular able to be achieved whereby the absolute state of charge of the energy store is no longer visible to the driver of the motor vehicle. As a result, the driving experience for the driver of the motor vehicle is able to be considerably improved when emulating HEV operation in a PHEV vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A user interface for a motor vehicle having a hybrid drive, wherein the hybrid drive comprises:
   an electrical machine; and
   an electrical energy store coupled to the electrical machine,
   wherein the hybrid drive is configured to be operable in a charge-consuming mode for the electrical energy store,
   wherein the hybrid drive is configured to be operable in a charge-retaining mode for the electrical energy store,
   wherein the charge-consuming mode and charge-retaining mode of the hybrid drive is driver selectable,
   wherein the user interface is configured to display a state of charge of the electrical energy store on a display, and to receive or calculate a state of charge variable characteristic of said state of charge,
   wherein, during operation of the hybrid drive in the charge-consuming mode, the state of charge variable is displayed with a first value range in a first display area,
   wherein, during operation of the hybrid drive in the charge-retaining mode of operation, the state of charge variable is displayed with a second value range, which is a subset of the first value range, in a second display area, and
   wherein the second display area is larger than a subrange of the first display area in which the second value range is displayed.

2. The user interface according to claim 1, wherein the user interface is configured to graphically display the state of charge variable, and the display area is an image area on the display.

3. The user interface according to claim 2, wherein the user interface is configured to display the state of charge variable, during operation of the hybrid drive in the charge-retaining mode, with a scale division value that is lower than when the hybrid drive operates in the charge-consuming mode.

4. The user interface according to claim 1, wherein the user interface is configured, during operation of the hybrid drive in the charge-retaining mode, to additionally display the state of charge variable with the first value range in the first display area.

5. The user interface according to claim 2, wherein the user interface is configured, during operation of the hybrid drive in the charge-retaining mode, to additionally display the state of charge variable with the first value range in the first display area.

6. The user interface according to claim 3, wherein the user interface is configured, during operation of the hybrid drive in the charge-retaining mode, to additionally display the state of charge variable with the first value range in the first display area.

7. The user interface according to claim 1, wherein the charge-retaining mode of operation is an initial mode of operation of the hybrid drive when the motor vehicle is started.

8. The user interface according to claim 2, wherein the charge-retaining mode of operation is an initial mode of operation of the hybrid drive when the motor vehicle is started.

9. The user interface according to claim 3, wherein the charge-retaining mode of operation is an initial mode of operation of the hybrid drive when the motor vehicle is started.

10. The user interface according to claim 4, wherein the charge-retaining mode of operation is an initial mode of operation of the hybrid drive when the motor vehicle is started.

11. The user interface according to claim 1, wherein the user interface is configured, starting from the charge-retaining mode, when charging the electrical energy store using a charging device external to the vehicle,
    to automatically switch into the charge-consuming mode, and
    to correspondingly display the state of charge.

12. The user interface according to claim 2, wherein the user interface is configured, starting from the charge-retaining mode, when charging the electrical energy store using a charging device external to the vehicle,
    to automatically switch into the charge-consuming mode, and
    to correspondingly display the state of charge.

13. The user interface according to claim 3, wherein the user interface is configured, starting from the charge-retaining mode, when charging the electrical energy store using a charging device external to the vehicle,
    to automatically switch into the charge-consuming mode, and
    to correspondingly display the state of charge.

14. The user interface according to claim 1, wherein the user interface is configured, starting from the charge-retaining mode of operation, when charging the electrical energy store by a charging device external to the vehicle,
    to remain in the charge-retaining mode, and
    to shift the display of the state of charge in accordance with a new state of charge.

15. The user interface according to claim 2, wherein the user interface is configured, starting from the charge-retaining mode of operation, when charging the electrical energy store by a charging device external to the vehicle,
    to remain in the charge-retaining mode, and
    to shift the display of the state of charge in accordance with a new state of charge.

16. The user interface according to claim 3, wherein the user interface is configured, starting from the charge-retaining mode of operation, when charging the electrical energy store by a charging device external to the vehicle,
    to remain in the charge-retaining mode, and
    to shift the display of the state of charge in accordance with a new state of charge.

17. A method for a motor vehicle having a hybrid drive, wherein the hybrid drive comprises an electrical machine and an electrical energy store coupled to the electrical machine, wherein the hybrid drive is configured to be operable in a charge-consuming mode for the energy store, wherein the hybrid drive is configured is configured to be operable in a charge-retaining mode for the energy store, wherein the charge-consuming mode and charge-retaining mode of the hybrid drive is driver selectable, the method comprises the acts of:

receiving or calculating a state of charge variable characteristic of a state of charge of the electrical energy store, and displaying the state of charge of the electrical energy store on a display, wherein, during operation of the hybrid drive in the charge-consuming mode, the state of charge variable is displayed with a first value range in a first display area, wherein, during operation of the hybrid drive in the charge-retaining mode, the state of charge variable is displayed with a second value range, which is a subset of the first value range, in a second display area, and wherein the second display area is larger than a subrange of the first display area in which the second value range is displayed.

* * * * *